United States Patent
Peacock

(10) Patent No.: US 7,568,447 B2
(45) Date of Patent: Aug. 4, 2009

(54) MILKING MACHINES

(75) Inventor: Andrew Mark Peacock, Roslin Midlothian Scotland (GB)

(73) Assignee: Green Source Automation LLC, Ceres, CA (US)

(*) Notice: Subject to any disclaimer, the term of this patent is extended or adjusted under 35 U.S.C. 154(b) by 612 days.

(21) Appl. No.: 11/307,000

(22) Filed: Jan. 18, 2006

(65) Prior Publication Data

US 2006/0196432 A1  Sep. 7, 2006

(30) Foreign Application Priority Data

Aug. 11, 2003  (GB) ................... 0318733.3

(51) Int. Cl.
*A01J 5/00* (2006.01)
(52) U.S. Cl. .................. 119/14.08; 119/14.14
(58) Field of Classification Search ............. 119/14.08, 119/14.01, 14.02, 14.03, 14.18, 14.14
See application file for complete search history.

(56) References Cited

U.S. PATENT DOCUMENTS

| | | | |
|---|---|---|---|
| 5,379,721 A | 1/1995 | Dessing et al. | |
| 5,979,359 A | 11/1999 | Hansson | |
| 6,234,109 B1* | 5/2001 | Andersson et al. | 119/14.08 |
| 6,257,169 B1 | 7/2001 | Oosterling | |
| 6,341,575 B1 | 1/2002 | Forsén | |
| 6,363,883 B1 | 4/2002 | Birk | |
| 6,377,353 B1* | 4/2002 | Ellis | 356/603 |
| 6,405,672 B1* | 6/2002 | De Mol et al. | 119/14.15 |
| 6,431,116 B1* | 8/2002 | Nilsson | 119/14.08 |
| 6,532,892 B1* | 3/2003 | Nilsson | 119/14.03 |
| 6,860,226 B2* | 3/2005 | Nilsson | 119/14.02 |

FOREIGN PATENT DOCUMENTS

| | | |
|---|---|---|
| EP | 0232568 | 8/1987 |
| EP | 0300582 | 1/1989 |
| EP | 0360354 | 3/1990 |
| EP | 0467489 | 1/1992 |
| EP | 0479397 | 4/1992 |
| EP | 0565189 | 10/1993 |
| EP | 0643907 | 3/1995 |
| EP | 1279327 | 1/1997 |
| EP | 0779025 | 6/1997 |
| EP | 0824857 | 2/1998 |
| WO | WO98/45808 | 10/1998 |
| WO | WO0011936 | 3/2000 |
| WO | WO01/19172 | 3/2001 |
| WO | WO02/07098 | 1/2002 |
| WO | WO0200011 | 1/2002 |

\* cited by examiner

*Primary Examiner*—Yvonne R. Abbott
(74) *Attorney, Agent, or Firm*—Daniel N. Lundeen; Lundeen & Lundeen, PLLC

(57) ABSTRACT

A teat locating sensor for use in farming equipment such as robotic milking machines and teat disinfection units. One or more cameras capture an image of the udder. The captured image is processed by applying an edge detector to provide an edge image. A Hough transform is applied for detecting edges using semi-circles and near vertical forms. A feature detector then matches these to provide teat ends and teat sides and thus produces a teat location map. Colour or monochrome cameras can be used and a 2D or 3D map can be generated. Filtering is described to improve the accuracy if required.

24 Claims, 5 Drawing Sheets

MILKING MACHINES

The present invention relates to apparatus and methods used in farming equipment such as robotic milking machines and teat disinfection units, and in particular to apparatus and methods for determining the location of an animal's teats.

Robotic milking systems are becoming an important tool in the dairy industry. By providing an automatic milking machine to which a cow can enter and be milked at their convenience, this has enabled a reduction in labour requirements and produced an increase in milk yield through more frequent milking.

Typically a robotic milking machine performs the tasks of recognising the cow teats; locating the cow teats; attaching the teat cups; together with, cleaning, pre-milking, milking and disinfecting the udder and teats of the cow. Due to the working environment and the wide variation in teat size, shape and orientation, the step of locating the cow teats has proved difficult. As such, a variety of systems and methods have been tried for locating the cow teats.

WO 01/19172 to DeLaval Holding AB discloses a laser based teat location system. The system comprises first and second illuminating sources by which a first and a second discrete areas are illuminated. This structured light, typically from a laser, is reflected from the surface of the teat and detected. By calculating the geometry of the reflected sources information about the orientation of the teat is gathered.

EP 0 232 568 to Multinorm BV discloses an ultrasonic transmitter based teat location system. The system is designed to follow a small moving object using an ultrasonic transmitter and receiver pair. Positional information is obtained by measurements of the time taken for the ultrasonic waves to be reflected from a teat.

EP 0 467 489 to C. van der Lely NV provides a sensor using electromagnetic radiation i.e. laser or infrared source. The source is scanned over the teats and the reflected signal is analysed to provide location information on each teat.

These existing systems have a number of disadvantages in that they are expensive, slow, unreliable and prone to mechanical failure due to the inclusion of moving parts. In an attempt to overcome some of these difficulties, camera based systems for teat detection have been proposed.

WO 02/00011 to Identico Electronics BV discloses a method of determining teat location by obtaining two independent images of the udder from one or two cameras. Each image has a common reference, and the images are processed to provide a 3D udder pattern on the basis of the reference. Typically, the reference is a light source providing a brightly illuminated dot on the udder.

WO 00/11936 to Alfa Laval Agri AB provides for a method of determining the location of a moving animal. Consecutive images are captured and by subtraction, or image differencing, the animal can be tracked.

These camera based systems have difficulties in that they are not robust to the difficult farm environment and also to varying teat appearances.

It is therefore an object of the present invention to provide a teat locating sensor for use in an automated machine which eliminates at least some of the shortcomings of the prior art.

It is a further object of the present invention to provide a method of determining the location of a teat on an animal for use in an automated machine which eliminates at least some of the shortcomings of the prior art.

According to a first aspect of the present invention there is provided a teat locating sensor for use in an automated machine, the sensor comprising;

At least one image capturing means for capturing an image of an udder, edge detector means for detecting edges in the captured image to produce an edge image and feature detector means for detecting at least one teat feature in the edge image to provide a teat location map.

The at least one teat feature may be a teat end. Alternatively the at least one teat feature may be a teats sides. The teat sides provide additional information on the angular orientation of a teat. In a preferred embodiment both the teat ends and the teat sides are provided in the teat location map.

Preferably the edge detector means and the feature detector means are located in at least one processor. Preferably the processor is situated adjacent or in the vicinity of the at least one image capturing means.

Preferably the sensor further includes first filtering means to remove noise from the captured image. Preferably the first filtering means is located in a pre-processor. The pre-processor may be integral with the processor.

Preferably the sensor includes a colour edge detect system. Alternatively, the sensor may further include image conversion means to convert the captured image to greyscale. Preferably the image conversion means is located in the processor. Alternatively the image conversion means may be located in the pre-processor.

Preferably the sensor further includes second filtering means to remove erroneous teat observations from the teat location maps. Preferably the second filtering means is located in the processor.

Preferably the at least one image capturing means is a video camera. More preferably the at least one image capturing means is a colour CMOS video camera. Such a camera makes the sensor cheap and robust. In a preferred embodiment, there are two image capturing means to provide a 3D teat location map. Alternatively there may be three or more image capturing devices to overcome difficulties of occlusion and improve accuracy.

Preferably the edge detector means is a Canny edge detector. Optionally the edge detector means may be a Sobel, Laplacian or SUSAN edge detector.

Preferably the feature detector means detects semi-circles. Advantageously the feature detector means is a Hough transform. For detecting teat ends the Hough transform detects semi-circles which face downwards in the edge image. For detecting teat sides the Hough transform detects edges within a given threshold of the vertical.

Preferably the first filtering means comprises one or more Gaussian filters. Preferably the image conversion means comprises a weighted sum of components algorithm.

Preferably the second filtering means is a Kalman filter. Alternatively the second filtering means may be a discounted least squares algorithm.

According to a second aspect of the present invention there is provided a method of providing the location of teats on an animal for use in an automated process, comprising the steps:

positioning a teat locating sensor according to the first aspect in the vicinity of an udder of an animal;

capturing an image of the udder to provide a captured image;

applying an edge detector to the captured image to provide an edge image; and applying a feature detector to the edge image to provide a teat location map.

Preferably the captured image is a colour video image. Alternatively the captured image may be an infrared image. Yet further, the captured image may be a monochrome image.

Preferably the method includes the step of pre-processing the captured image to reduce noise. The captured image may be filtered.

The method may include the step of converting the captured image to greyscale. Preferably the conversion step comprises calculating a weighted sum of the components (such as Red-Green-Blue) of the captured image. Preferably the method includes the step of choosing weights by Principal Component Analysis. Preferably also the method includes the step of using values of the principal component corresponding to the largest eigenvalue as the weights.

Preferably the step of applying an edge detector includes using a Canny edge detector. Preferably a Canny colour edge detector is used. Alternatively, this step may use a Sobel, Laplacian or SUSAN edge detector.

Preferably the step of applying an edge detector comprises applying a Hough transform to detect semicircles that face downwards in the edge image. Preferably, the Hough transform for circles is modified for the purpose of finding semi circles by not incrementing or alternatively decrementing the accumulator table for candidates that are the top half of the circle. Each semi-circle may represent a teat end.

Alternatively or additionally, the step of applying an edge detector may comprise applying a Hough Transform for detecting edges. Preferably only edges that are within a given threshold of the vertical are detected. These edges define sides of a teat. Advantageously the method includes the step of matching the detected edges to the semicircles by looking for edges that come within a given threshold of the semicircle contour, to provide observed teats.

Preferably the method includes the step of filtering the individual observed teats using a Kalman Filter. Preferably also, the method includes the step replacing missing observed teats from observed teats in earlier maps.

Advantageously the method includes the step of providing the angles of teats by taking the average angle of the two edges found for a given teat.

Preferably the method includes the step of combining teat location maps from different image capturing means to provide a 3D teat location map.

Embodiments of the present invention will now be described, by way of example only, with reference to the following drawings of which:

Figure 1:
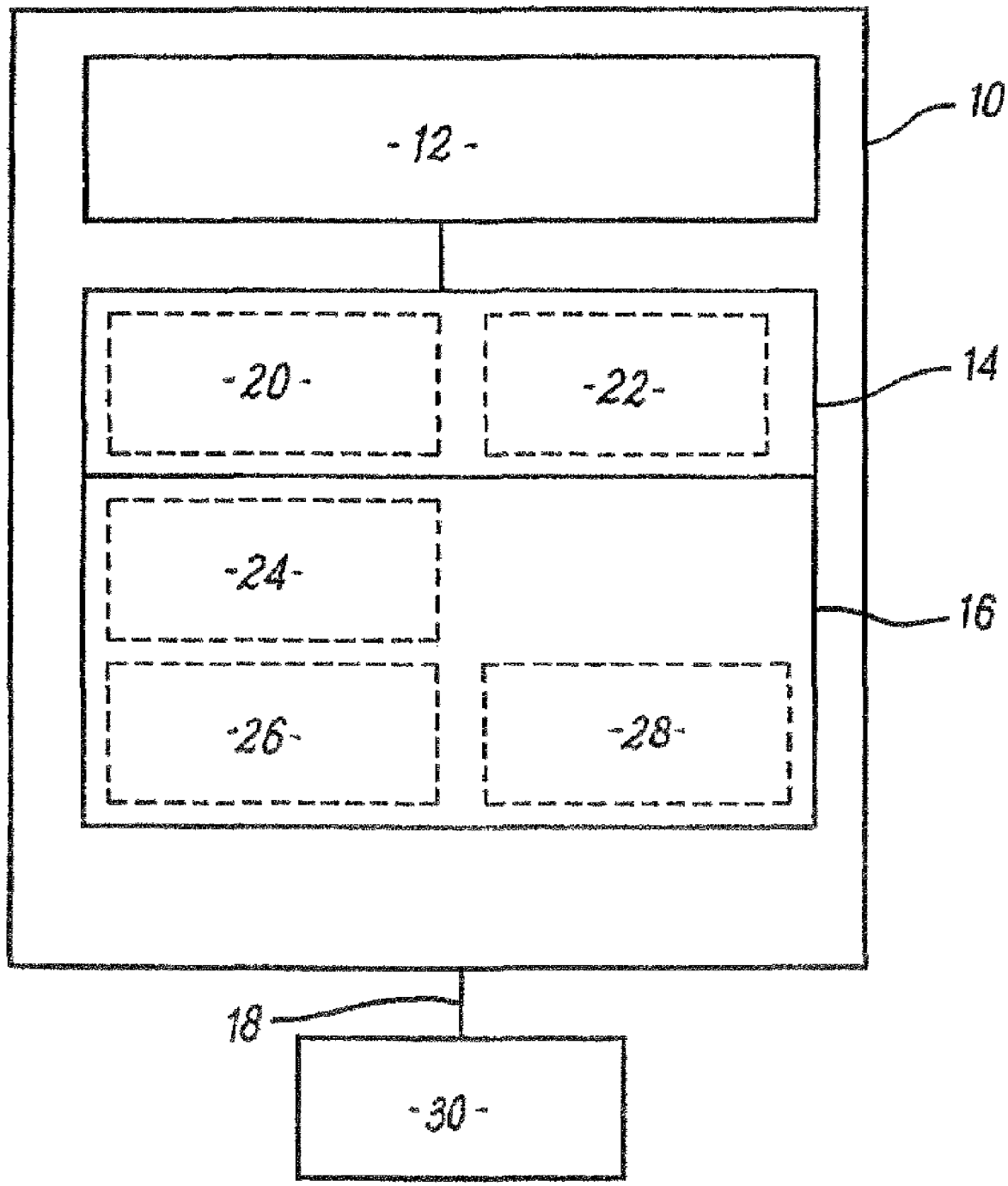
FIG. 1 is a schematic view of a teat locating sensor according to an embodiment of the present invention.

Reference is initially made to FIG. 1 of the drawings which illustrates a teat locating sensor, generally indicated by reference numeral 10, in accordance with an embodiment of the present invention. Sensor 10 comprises a camera 12, a pre-processor 14 and a processor 16. Sensor 10 provides an output 18, providing positional information on teat location for an automated system (not shown) which may be a milking or disinfecting system, for example.

Camera 12 is a colour CMOS video camera which provides a continuous stream of images in real-time. The images are referred to as 'captured images'.

Pre-processor 14 and processor 16 may be combined to a single processor. It will be appreciated that the processor can be a standard CPU or, alternatively, a dedicated circuit programmed to perform the necessary functions as described hereinafter. Pre-processor 14 includes a filter 20. Filter 20 is a Gaussian filter as is known in the art for reducing noise in the captured image. Also within pre-processor 14 is an image converter 22. The image converter 22 is an algorithm used to transform the colour captured image to greyscale. It will be clear to someone skilled in the art that the conversion to greyscale can be achieved by calculating a weighted sum of the components (such as Red-Green-Blue) of the colour image. The weights are chosen by performing Principal Component Analysis technique to the entire image. The values of the principal component corresponding to the largest eigenvalue are then used as the weights.

Processor 16 includes an edge detector 24. The edge detector 16 is a Canny edge detector as is known in the art. However other known techniques such as the Sobel, Laplacian or SUSAN edge detectors can be used. This produces an image referred to as an 'edge image'.

Processor 16 further includes a feature detector 26. The detector provides the image processing algorithm known as the Hough transform. The Hough transform for circles is modified for the purpose of finding semi circles by not incrementing or by decrementing the accumulator table for candidates that are the top half of the circle. Teat ends can be modelled as semicircles pointing downwards and so are identified by this process. The equation of a semi circle may be modelled by three parameters: its centre, x/y coordinates and radius. Additionally the Hough Transform for detecting edges is used for determining teat sides. Only edges that are within a given threshold (such as +/−20 degrees) of the vertical are detected. The detected edges are then matched to the semicircles by looking for edges that come within a given threshold (such as 5 pels) of the semicircle contour.

Due to the presence of noise and other artefacts, there may be more teats found by the feature detector 26 than actually exist. The processor 16 may therefore include a filter 28 to remove the erroneous points, if this is felt necessary. The filter 28 is the known Kalman Filter, but other known filters (such as discounted least squares) may be used. This process enables inaccurate observations to be ignored and where observations are missing enables the position of the teat to be predicted from earlier observations. The resulting map is referred to as a 'teat location map'. This map 30 forms the output 18. The map is not an image as it only contains information on the positions of the teats and does not include any surrounding detail. This reduces the amount of data to be manipulated and stored.

Figure 2:
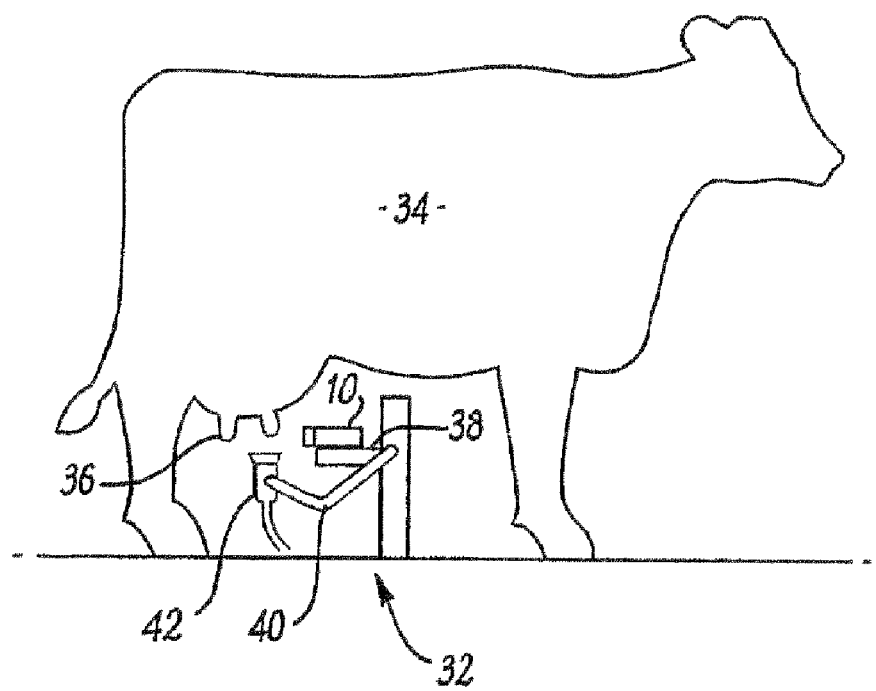
FIG. 2 is a schematic representation of a teat locating sensor according to an embodiment of the present invention incorporated in an automatic milking machine, in use.

In use, the sensor 10 is arranged within a robotic milking machine, as illustrated in FIG. 2. The sensor 10 could equally be installed in a teat disinfecting system, operating in the same manner. Like parts to those of FIG. 1 have been given the same reference numeral for clarity. The term robotic milking machine will be used to refer to any type of automated milking machine which is adapted to allow an animal to be milked with minimal or, ideally, no human intervention. Robotic milking machine 32 is located under an animal, such as a cow 34, to be milked. Sensor 10 is positioned with the camera facing the teats 36 of the cow 34 towards its rear. The output of the sensor 10 is fed to a control unit 38 of the machine 32. From the control unit a robot arm 40 is driven, using the teat position information in the teat location map, to locate a teat cup 42 onto the teats 36 of the cow 34 for milking.

Referring now to FIGS. 3 through 7, the method of locating the teats will be described for the embodiment presented in FIGS. 1 and 2. It should be noted that the teats require to be lit for a clear image to be captured. However, the natural light or artificial light commonly found in milking barns may be sufficient for some applications. A domestic light bulb providing a diffuse light source could also be used.

Figure 3:
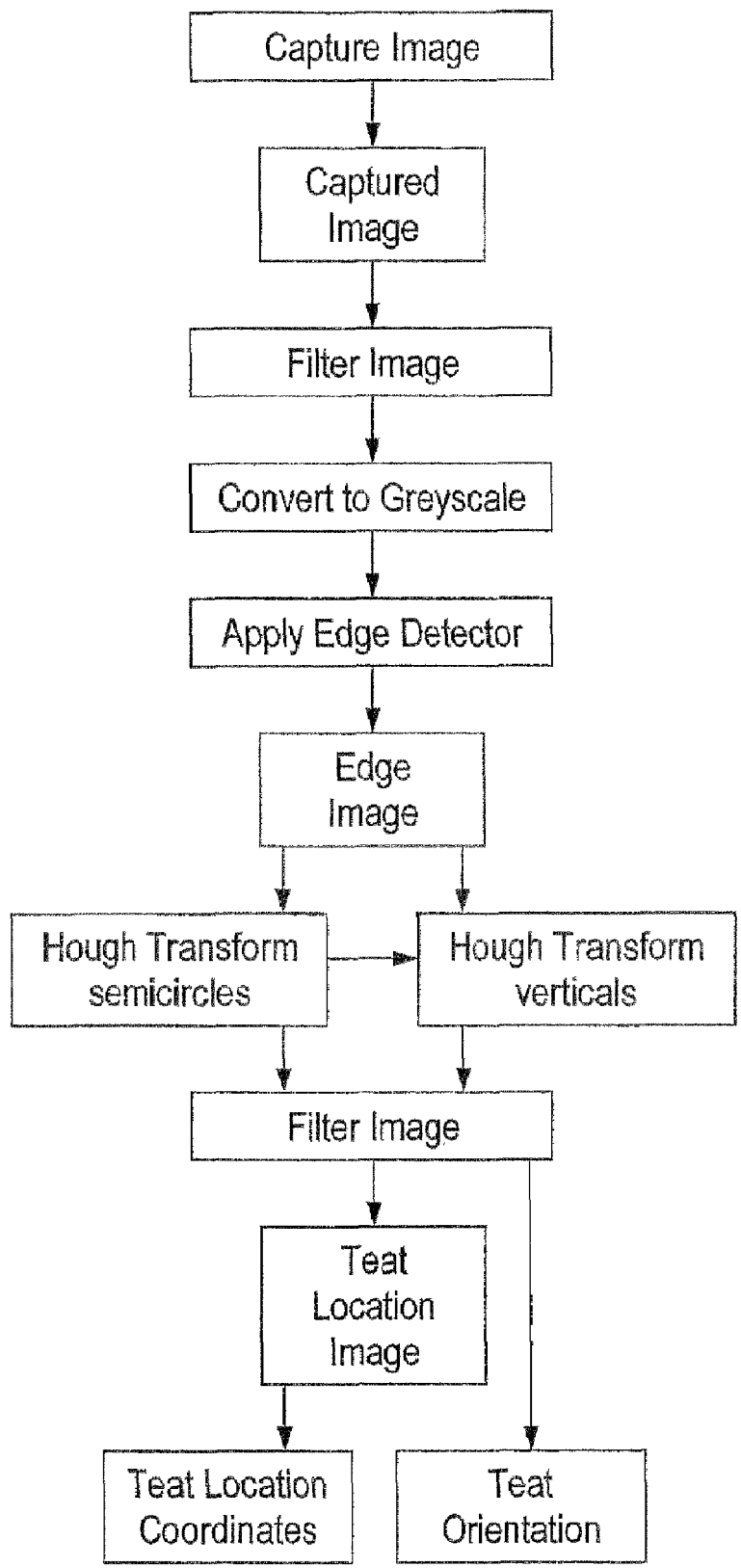
FIG. 3 is a diagrammatic flow chart displaying the method of an embodiment of the present invention.
Figure 4:
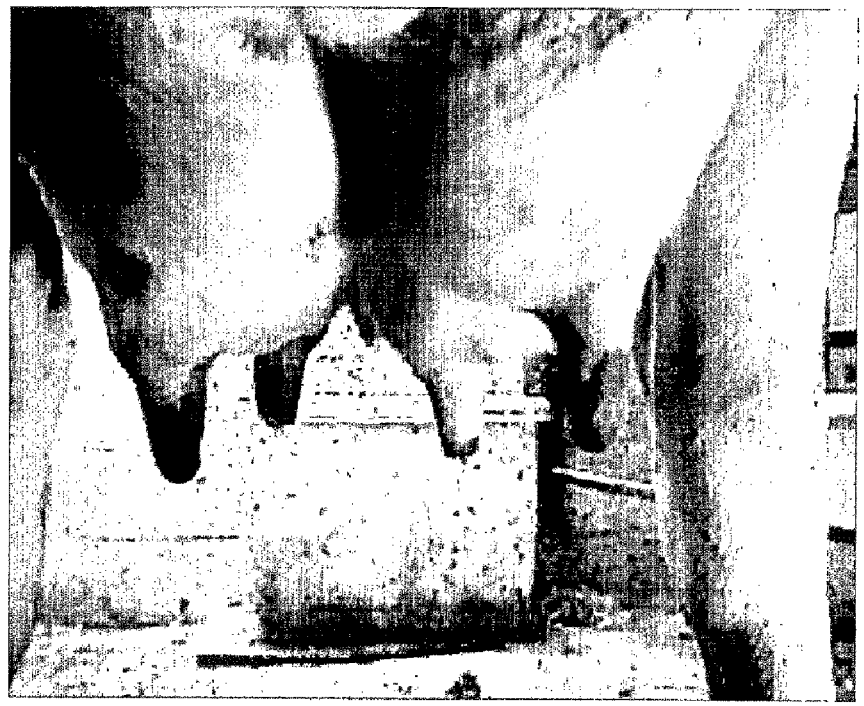
FIG. 4 is an example captured image according to an embodiment of the present invention.

As described hereinbefore, camera 12 captures continuous images of the cows teats 36. FIG. 4 shows a typical captured image, the image showing an udder with the four teats of a cow. A series of image processing algorithms, as illustrated in FIG. 3 are applied to find cow teat ends in the images formed by the camera 12.

The first step in the processing of the captured image is shown as pre-processing the image to reduce noise. Noise is reduced using standard techniques such as Gaussian filters. The image is also converted to greyscale before it can be processed. The conversion to greyscale is done by calculating a weighted sum of the components (such as Red-Green-Blue) of the colour image. The weights are chosen by performing the Principal Component Analysis technique to the entire image. The values of the principal component corresponding to the largest eigenvalue are then used as the weights.

Alternatively, the filtering and converting to grey scale can be omitted for some applications. In these cases, the location coordinates can be tracked over time and filtering is then only done if desired.

Figure 5:
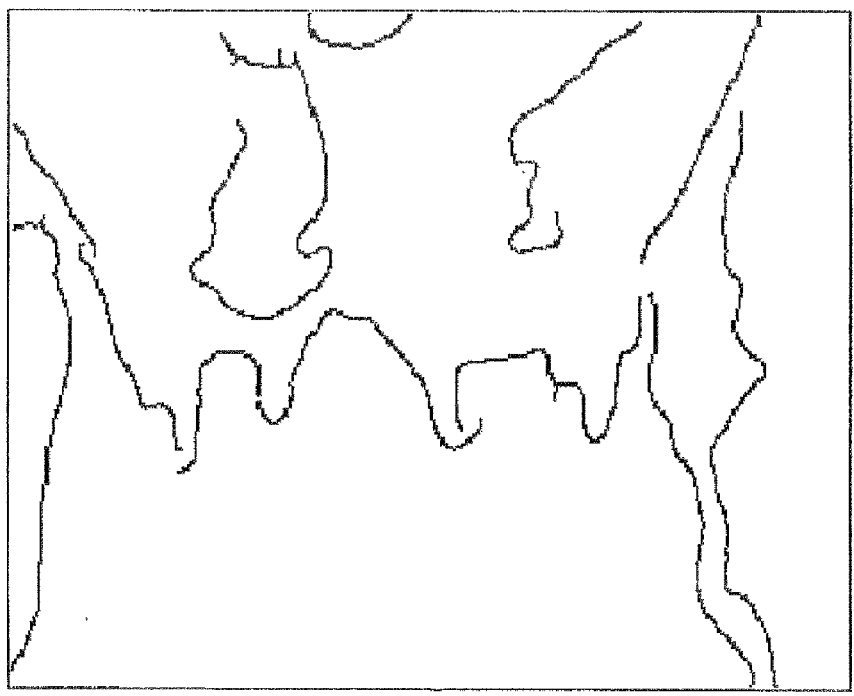
FIG. 5 is an example edge image according to an embodiment of the present invention.

The next step is to detect edge features in the captured images. This is done using a Canny edge detector. FIG. 5 shows an edge image for the captured image of FIG. 4.

On the edge image lines match the four teats, while additional lines are also identified.

Figure 6:
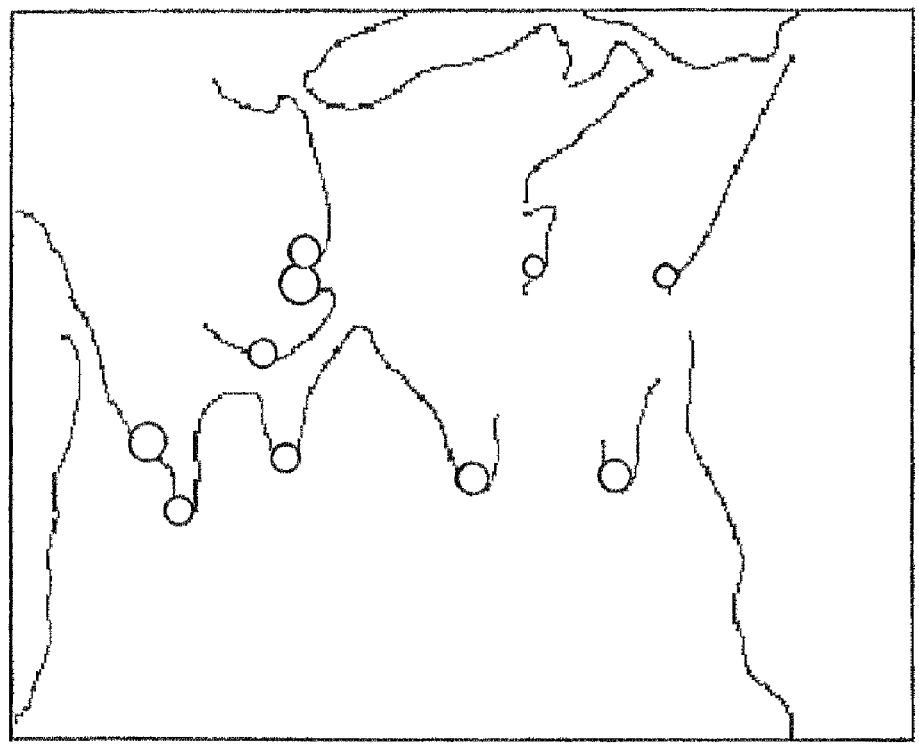
FIG. 6 is an example illustration of teat end candidates within an edge image following feature detection.

The next step is to detect teat ends in the image. We achieve this by applying the Hough transform to detect semicircles that face downwards in the edge image. The Hough transform for circles is modified for the purpose of finding semi circles by not incrementing or by decrementing the accumulator table for candidates that are in the top half of the circle. Teat ends can be modelled as semicircles pointing downwards and so are identified by this process. The equation of a semi circle may be modelled three parameters: by its centre, by its x/y coordinates and by its radius. As there may be noise and other artefacts in the image, a set of teat candidates more than the target teats alone may be produced by this process. This is demonstrated in FIG. 6, for the edge image of FIG. 5. In FIG. 6, ten teat candidates have been identified.

The next step is to detect the teat sides. This information is needed if the angle of a teat is needed. The teat sides are detected using the Hough Transform for detecting edges. Only edges that are within a given threshold, such as +/−20 degrees, of the vertical are detected. The detected edges are then matched to the semicircles by looking for edges that come within a given threshold (such as 5 pels) of the semicircle contour.

Figure 7:
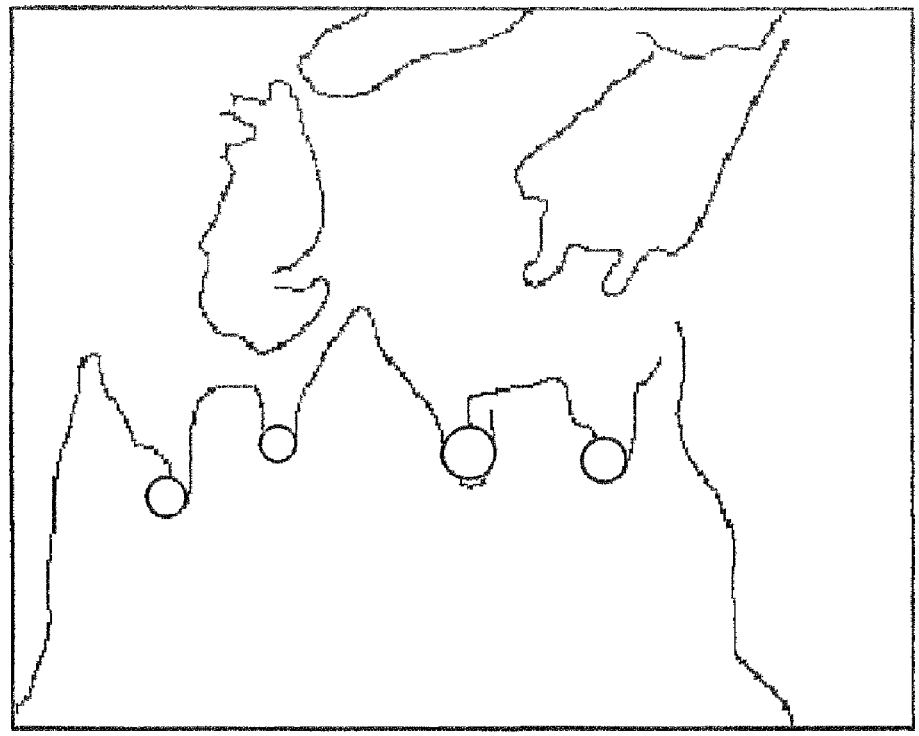
FIG. 7 is an example teat location map according to an embodiment of the present invention.

At this stage, the image may provide a teat location map. However, if the image appears noisy or has an incorrect number of teats, we can filter the individual teat end observations to remove erroneous teat observations and keep those representing the true teat positions. A Kalman filter is used for this, but other known filters (such as discounted least squares) may be used. This step enables inaccurate observations to be ignored. FIG. 7 shows a filtered image, which represents a teat location map. This map is the filtered map of FIG. 6. Spurious observations are now removed leaving the four teat observations. In the event that any observations are missing, predictions on a teat position can be made from the teat location maps of earlier or later captured images. The processing is performed in real-time, so that from the sequence of captured images, the position of the teats can be tracked in time.

If required, the angles of the teats can be determined by taking the average angle of the two edges found for a given teat.

Figure 8:
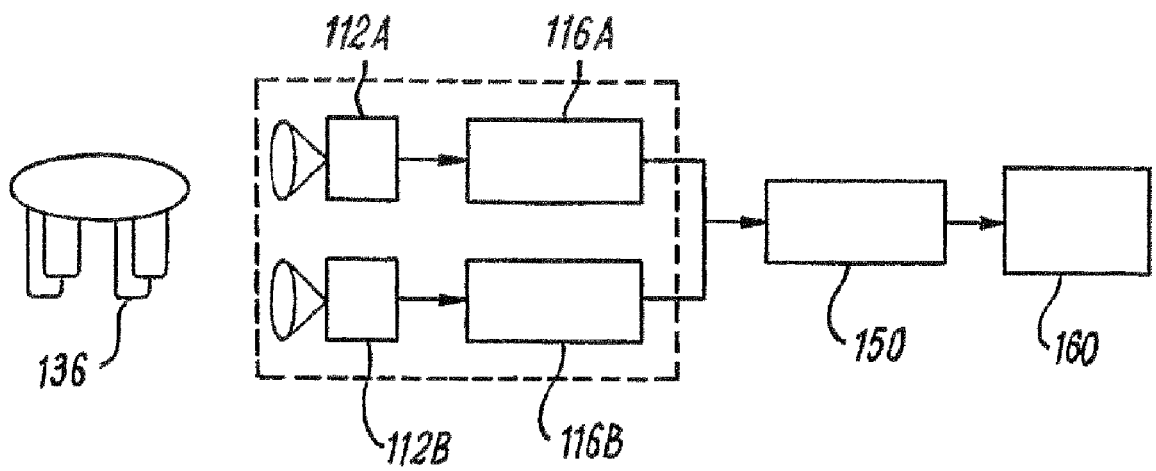
FIG. 8 is a schematic view of a teat locating sensor according to a preferred embodiment of the present invention.

Reference is now made to FIG. 8 of the drawings which illustrates a teat location sensor according to a preferred embodiment of the present invention. Like parts to those of FIGS. 1 and 2 have been given the same reference numeral, with the addition of 100. Teat locating sensor 110 essentially comprises a pair of teat locating sensors 10, as described in the earlier embodiment, with the inclusion of a further processor 150. Two cameras 112A,B are provided to capture pairs of images which are processed in parallel through processors 116A,B in an identical manner as described hereinbefore. To reduce the size of the sensor 110, pre-processing is also performed in the processors 116A,B. The teat location maps are fed into the further processor 150, which combines the maps to provide a 3D teat location map 160.

In use, the cameras 112A,B are located at known positions and orientations with respect to a determined world coordinate system (in this example embodiment between 50 mm and 500 mm), under the cow facing towards the rear. There are two modes of operation for the embodiment, an initial calibration, which need only be done once and does not require the presence of an animal, and a teat tracking mode.

The sensor 110 is initially calibrated by means of a calibration target, such as a chequer board, which is shown to the two cameras 112A,B. The sensor 110 then identifies the image of the chequer board as seen by the individual cameras 112A,B. These observations are then used together with knowledge of the calibration target to determine 3D world coordinates of both cameras. The calibration method is a standard technique known in the art. This calibration only has to be done once, for instance, when the robotic milking machine is installed.

The calibration data is stored in the processor 150. The cameras 112A,B capture images which are processed as describe hereinbefore. The teat location maps from each processor 116A,B are processed in the processor 150 and, together with the calibration data, a 3D teat location map 160 is provided. It will be clear to anyone skilled in the art that calculating the 3D position from the calibrated cameras and individual teat observations is a straightforward task. The 3D teat location map 160 provides more accurate positional information on the teat locations, than the 2D maps created from the first embodiment teat location sensor 10.

Furthermore, the 3D information can be used to discard any remaining spurious teat candidates whose 3D position is clearly out of the udder range.

A principal advantage of the present invention is that it provides a teat location sensor which is fast, operating in real-time, and robust, cameras and standard processing, for use in a farming environment. By applying a series of image algorithms, the quantity to processed data is reduced dramatically so that the processing power required is relatively small, allowing the sensor to be produced cheaply. Indeed, using cheaper processors and cameras means the sensor can be easily and affordably replaced if an animal damages it during use.

A further advantage of the present invention is that it can track the location of the teats. In this way the output of the sensor can be programmed into a robot arm of a milking machine or disinfecting unit so that the cups can track the teats for quick and accurate application. The further ability to determine the angle of a teat provides the opportunity to rotate a teat cup for more accurate and successful attachment to a teat. This makes the milking process more efficient and comfortable for the animal.

A yet further advantage of the present invention is in the use of edge detectors coupled with feature detectors. This reduces the amount of information being processed and is insensitive to added matter such as mud, coating the udder, as this will be filtered as spurious information.

It will be appreciated by those skilled in the art that various modifications may be made to the invention hereindescribed without departing from the scope thereof. For example, it is recognised that there are a number of edge detectors and filters known in the art which will work in place of the Canny edge detector, Gaussian and Kalman filters described. It will also be understood that while the teat locating sensor is described for use on a robotic milking machine it would find equal employment on apparatus for inspection and application of materials to the teats such as in treatment and disinfection of the teats.

What is claimed is:

1. A teat locating sensor for use in an automated system, the sensor comprising at least one image capturer for capturing an image of an udder, an edge detector for detecting edges in the captured image to produce an edge image and a feature detector for detecting at least one teat feature in the edge image by detecting semi-circles in the edge image to thereby provide a teat location map.

2. A teat locating sensor as claimed in claim 1 wherein the at least one teat feature is a teat end.

3. A teat locating sensor as claimed in claim 1 wherein the at least one teat feature is teat sides.

4. A teat locating sensor as claimed in claim 1 wherein the edge detector and the feature detector are located in at least one processor.

5. A teat locating sensor as claimed in claim 1 wherein the sensor further includes a first filter to remove noise from the captured image.

6. A teat locating sensor as claimed in claim 1 wherein the sensor includes a colour edge detect system.

7. A teat locating sensor as claimed in claim 1 wherein the sensor includes an image converter to convert the captured image to greyscale.

8. A teat locating sensor as claimed in claim 1 wherein the sensor includes a second filter to remove erroneous teat observations from the teat location maps.

9. A teat locating sensor as claimed in claim 1 wherein the at least one image capturer is a video camera.

10. A teat locating sensor as claimed in claim 1 wherein there are two image capturers to provide a 3D teat location map.

11. A teat locating sensor as claimed in claim 1 wherein the feature detector is a Hough transform.

12. A method of providing the location of teats on an animal for use in an automated process, comprising the steps of:

positioning a teat locating sensor for use in an automated system in the vicinity of an udder of an animal;
capturing an image of the udder with an image capturer of the teat locating sensor to provide a captured image;
applying an edge detector of the teat locating sensor to the captured image to provide an edge image; and
applying a feature detector of the teat locating sensor to the edge image to provide a teat location map, the feature detector detecting at least one teat feature in the edge image by detecting semi-circles in the edge image.

13. A method of providing the location of teats on an animal as claimed in claim 12 wherein the captured image is a colour video image.

14. A method of providing the location of teats on an animal as claimed in claim 12 wherein the captured image is a monochrome image.

15. A method of providing the location of teats on an animal as claimed in claim 12 wherein the method includes the step of pre-processing the captured image to reduce noise.

16. A method of providing the location of teats on an animal as claimed in claim 12 wherein the method includes the step of converting the captured image to greyscale.

17. A method of providing the location of teats on an animal as claimed in claim 12 wherein the step of applying an edge detector includes using a Canny edge detector.

18. A method of providing the location of teats on an animal as claimed in claim 12 wherein the step of applying an edge detector comprises applying a Hough transform to detect semicircles that face downwards in the edge image.

19. A method of providing the location of teats on an animal as claimed in claim 12 wherein the step of applying an edge detector comprises applying a Hough Transform for detecting edges.

20. A method of providing the location of teats on an animal as claimed in claim 19 wherein the method includes the step of matching the detected edges to the semicircles by looking for edges that come within a given threshold of the semicircle contour, to provide observed teats.

21. A method of providing the location of teats on an animal as claimed in claim 19 wherein the method includes the step of providing the angles of teats by taking the average angle of the two edges found for a given teat.

22. A method of providing the location of teats on an animal as claimed in claim 12 wherein the method includes the step of filtering the individual observed teats using a Kalman filter.

23. A method of providing the location of teats on an is animal as claimed in claim 12 wherein the method includes the step of replacing missing observed teats from observed teats in earlier maps.

24. A method of providing the location of teats on an animal as claimed in claim 12 wherein the method includes the step of combining teat location maps from different image capturers to provide a 3D teat location map.

* * * * *